United States Patent [19]

Staab

[11] Patent Number: 4,694,450
[45] Date of Patent: Sep. 15, 1987

[54] METHOD AND APPARATUS FOR ADAPTIVE RECEIVER SQUELCH ECHO CONTROL

[76] Inventor: Hans P. Staab, 281 Ridge Rd., New Milford, Conn. 06776

[21] Appl. No.: 616,017

[22] Filed: May 31, 1984

[51] Int. Cl.$^4$ .................. H04J 15/00; H04L 5/14; H04B 3/20

[52] U.S. Cl. .................. 370/32.1; 379/97; 379/407

[58] Field of Search .................. 370/32, 24; 179/170.2

[56] References Cited

U.S. PATENT DOCUMENTS

| | | | |
|---|---|---|---|
| 3,721,777 | 3/1973 | Thomas | 179/170.2 |
| 3,823,275 | 7/1974 | La Marche et al. | 179/170.2 |
| 3,900,708 | 8/1975 | Bendel | 179/170.2 |
| 4,029,912 | 6/1977 | Geigel et al. | 179/170.2 |
| 4,064,378 | 12/1977 | Kitayama et al. | 179/170.2 |
| 4,394,767 | 7/1983 | Shum | 179/170.2 |
| 4,481,622 | 11/1984 | Cheng et al. | 370/32 |

*Primary Examiner*—Douglas W. Olms
*Assistant Examiner*—Wellington Chin
*Attorney, Agent, or Firm*—Pennie & Edmonds

[57] ABSTRACT

After receipt of the answerback tone in a conventional handshaking procedure, the originate modem is connected to the communication line, sends a short echo control training (ECT) sequence to the answer modem, and starts a timer. Upon receipt of the $ECT_o$ sequence, the answer modem sends its own $ECT_a$ sequence to the originate modem and starts its own timer. Upon receiving the $ECT_a$ sequence, the originate modem measures the round trip propagation delay ($T_{RTPD}$) and transmits a second $ECT_o$ sequence. The time of receipt of this sequence at the answer modem is used by the answer modem to determine $T_{RTPD}$. Either modem may now start data transmission. Because of the measurements made, the receiver at the transmitting modem is aware that the echo from its transmission will be delayed by $T_{RTPD}$. Accordingly, it will open an "echo monitor window" in a time interval around $T_{RTPD}$ during which time frame any received energy is assumed to be an echo. If an echo is detected in such time interval, the receiver will be squelched until energy is no longer detected. Moreover, knowledge of $T_{RTPD}$ also permits the modem to select an optimum length training sequence because the quality of the communication line depends on its length.

4 Claims, 4 Drawing Figures

METHOD AND APPARATUS FOR ADAPTIVE RECEIVER SQUELCH ECHO CONTROL

BACKGROUND OF THE INVENTION

This relates to an improved method and apparatus for echo control in data transmission circuits which will provide maximum data throughput with minimal increase in hardware.

The primary source of echo on a telephone network is a circuit mismatch at a device called a Hybrid which is the interface between "two wire" and "four wire" circuits. The two wire circuits carry transmission in both directions and connect individual telephones to their central offices and also interconnect central offices when the distance between them is very short. Four wire circuits provide separate paths for each direction of transmission. Long distance trunks are always four wire circuits because signal processing (multiplexing, amplification, etc.) can only be done with separate paths for each direction.

Ideally, the Hybrid should pass all the signal on the incoming four wire channel to the two wire circuit with no leakage into the outgoing four wire channel. Unfortunately, this is not the case and the signal leaking across the Hybrid returns as an echo to the person talking at the other end of the four wire circuit. This type of echo is called "talker echo" since the talker hears his own voice delayed by the round trip delay between his telephone and the Hybrid at the far end.

Most full duplex data sets of modems are not susceptible to talker echo because of frequency separation of the transmit and receive signals. For half duplex data sets, however, the return echo from the outgoing transmission may be received and passed on to the terminal as valid data. Coping with this problem has become more difficult with the introduction of satellite circuits that have significant round trip propagation delays (RTPD) in excess of 600 milliseconds (msec.) compared to delays of less than 50 msec. on land microwave circuits and 100 msec. on cable connections. Such extremely long delays significantly decrease two-way data throughput since there must be a delay equal in length to the RTPD between the time one terminal ends transmission and the time it begins to receive a response. These delays are especially troublesome in higher speed data sets where the length of a typical data message is relatively short (e.g., 10 msec.).

Historically, half duplex data sets have dealt with echoes by squelching the receiver until all echoes have passed. The receiver ignores energy on the line while the transmitter is sending and remains squelched until it sees a gap of energy, making it blind to talker echoes. However, as emphasized in U.S. Pat. No. 4,394,767 which is incorporated herein by reference, this "blind squelch" method has the disadvantage of requiring the communication system to assume that the RTPD is 600 msec. or more since the system does not know if the data sets are interconnected by satellite or by shorter land circuits. As a result, the transmitter will send a filler to ensure that the message is at least 600 msec.; and the minimum time between successive data transmissions on the system (i.e., minimum turnaround time) must be on the order of 600 msec.

A further complication has arisen, however, with the introduction of echo cancellers into satellite communication systems. Echo cancellers, as the name implies, control the echo by synthesizing a replica of the echo and subtracting it from the actual echo. Because the echo canceller has no prior knowledge of the characteristics of the circuit, the echo canceller must be adaptive; and to adapt the echo canceller to the circuit, a training preamble is required. The use of such a preamble, however, causes a delay before the circuit is properly conditioned for communication. While this preamble can be realitvely short if the equipment used is that of some manufacturers such as General DataComm Industries, Inc., the assignee of the present invention, conventional AT&T equipment requires a preamble of up to 500 msec. Because it is difficult to determine in advance if a particular call will use a satellite or terrestrial link and what echo control equipment might be in the link, in practice it is necessary to provide a lengthy preamble to train any echo canceller that may be present and to squelch the receiver until after the time that a data echo would return. As a result, the minimum turnaround time is on the order of 1.2 seconds. For this reason, the blind squelch method, although technically possible, is not a good solution.

Another data set echo control technique that is widely used is the echo suppressor that is commonly found on trunks of more than 3000 kilometers. These devices are voice operated switches which allow energy to pass only in one direction, eliminating a reflected echo. Modems usually disable suppressors and use the echo control methods mentioned above. While the suppressors could be used to eliminate echo, such use would introduce a different problem, because the suppressors require approximately 100 ms to reverse their transmission direction. This turnaround time chops off about 100 millisecoonds from the front end of the data transmission, a problem that is especially acute in modems with adaptive equalizers since the first part of the transmission is required to "train" their equalizer.

The modem can avoid this problem by sending energy such as unmodulated carrier to reverse the echo suppressors before beginning data transmission. With such a technique, which is called "sacrificial carrier," a delay of about 150 msec. is required before data transmission can begin. Obviously, this smaller delay is preferred to the 600 msec. transmission required by the blind receiver squelch method. However, because no attempt is made to determine the need for a sacrificial carrier, turn around time will always be degraded, even when an echo suppressor is not present. Moreover, end-to-end compatibility may be a problem because the modems on both ends have to use this echo control technique for it to work. The modem therefore has to determine if the far end modem is also compatible with this method. This problem, which is technically possible to solve, does require a cumbersome preliminary handshaking procedure which may also confuse the terminal equipment.

SUMMARY OF THE INVENTION

In accordance with my invention, data communication is initiated as in the prior art by a handshaking sequence of applying a ringing signal to an answer modem in response to a signal from an originate modem, connecting the answer modem to the communication line after receipt of the ringing signal, and transmitting an answerback tone from the answer modem to the originate modem after a period of silence following connection of the answer modem to the line. After receipt of the answerback tone, the originate modem is connected to the communication line; and in accordance with the invention the originate modem sends a short echo control training (ECT) sequence to the answer modem and starts a timer. Upon receipt of the $ECT_o$ sequence, the answer modem sends its own $ECT_a$ sequence to the originate modem and starts its own timer. Upon receiving the $ECT_a$ sequence, the originate modem measure the round trip propagation delay ($T_{RTPD}$) and transmits a second $ECT_o$ sequence. The time of receipt of this sequence at the answer modem is used by the answer modem to determine $T_{RTPD}$.

Either modem may now start data transmission. Because of the measurements made, the receiver at the transmitting modem is aware that the echo from its transmission will be delayed by $T_{RTPD}$. Accordingly, it will open an "echo monitor window" in a time interval around $T_{RTPD}$ during which time any received energy is assumed to be an echo. If an echo is detected in such time interrval, the receiver will be squelched until energy is no longer detected. The transmitting modem will also continue to measure the latest round trip delay and make small corrections to its echo monitor window. This allows the modem to adjust for small variations in round trip delay. Thus, the present invention provides for an adaptive receiver squelch.

Moreover, knowledge of $T_{RTPD}$ also permits the modem to select an optimum length training sequence depending on the length of the communication link.

BRIEF DESCRIPTION OF THE DRAWINGS

These and other objects, features and advantages of the invention will be more readily apparent from the following description of the best mode for carrying out the invention in which.

BEST MODE OF CARRYING OUT THE INVENTION

Figure 1:
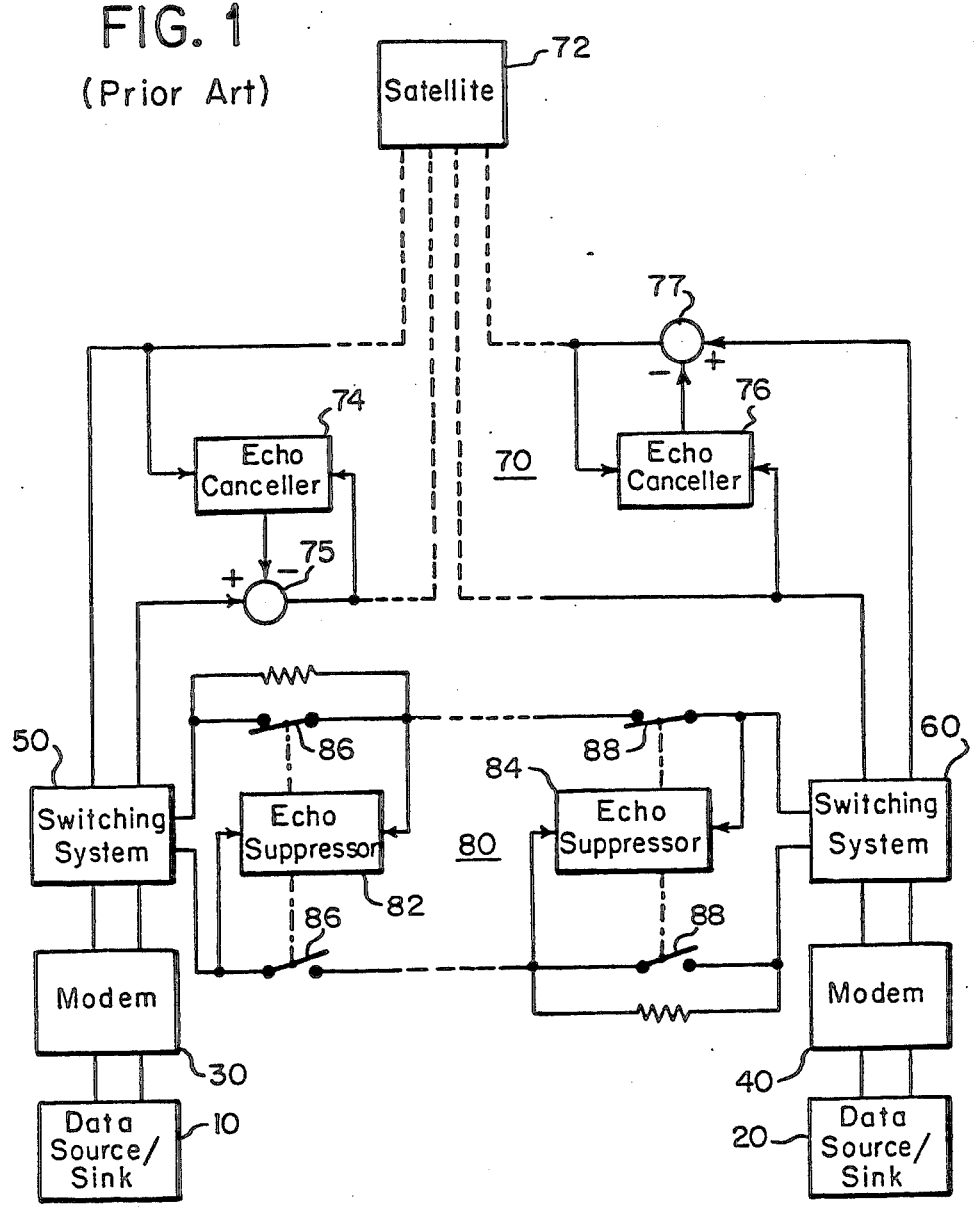
FIG. 1 is a block diagram of a typical communication system in which the invention may be practiced.

FIG. 1 depicts a typical data communication system comprising first and second data source/sinks 10, 20, first and second modems (or data sets) 30, 40, and first and second switching system 50, 60. As indicated in FIG. 1, data source/sink 10, modem 30 and switching system 50 are connected together and illustratively may constitute the local side of the communication system. Similarly, data source/sink 20, modem 40 and switching system 60 are connected together and illustratively constitute the remote side of the communication system.

Switching system 50, 60 may be interconnected either by transmission network 70 or transmission network 80. As shown, transmission network 70 is an earth satellite network comprising earth satellite 72, first and second echo cancellers 74, 76 and first and second summing junctions 75, 77. Transmission network 80 is typical of a microwave or cable network and includes echo suppressors 82, 84 which are operated so as to produce at least a 35 db signal loss in one direction of communication but not in the other. Such signal loss is depicted schematically in FIG. 1 in the control of switches 86, 88 by echo suppressors 82, 84.

As will be apparent, the data communication system shown in FIG. 1 has several ambiguities which must be accounted for by the apparatus which controls the communication network. Since in present practice this apparatus is ordinarily the modem, I will describe this control function as being performed by the modem. As will be apparent, however, the invention may also be practiced using equivalent devices which produce comparable control of the communication system. One ambiguity is, of course, the length of the communication circuit. A satellite communication system may easily be ten times the length of a land based communication system between the same two points. As a result, round trip propagation delays in the satellite communication system may be on the order of 600 msec. or more compared with round trip propagation delays of 50 to 100 msec. in microwave or cable systems. A second ambiguity is whether the circuit contains any echo control means at all and, if it does, whether such control means are echo cancellers or echo suppressors, if echo control equipment is used, another ambiguity is the length of the preamble or training sequence required to adapt the equipment to normal data transmission.

Because of these ambiguities, it is necessary in conventional data communications systems to provide for a worst case situation. Typically, this requires the source of data transmission to allow for a round trip propagation delay in excess of 600 msec. and also requires it, during initial transmission, to provide an echo canceller training sequence on the order of 500 to 600 msec. This results in a minimum turnaround time between successive data transmission on the order of 0.6 seconds. However, because the data transmission itself is usually very short, for example, 10 msec., these delays are not acceptable where a multiplicity of messages are interchanged between a pair of communicating modems.

In the present invention, the handshaking sequence that is used to initiate communication between two modems is modified so as to provide information as to the nature of the echo control device and transmission path length between the modems. This information is then used to adapt the duration of the receiver squelch so as to optimize the turnaround time in subsequent data transmission between the two modems.

Figure 2:
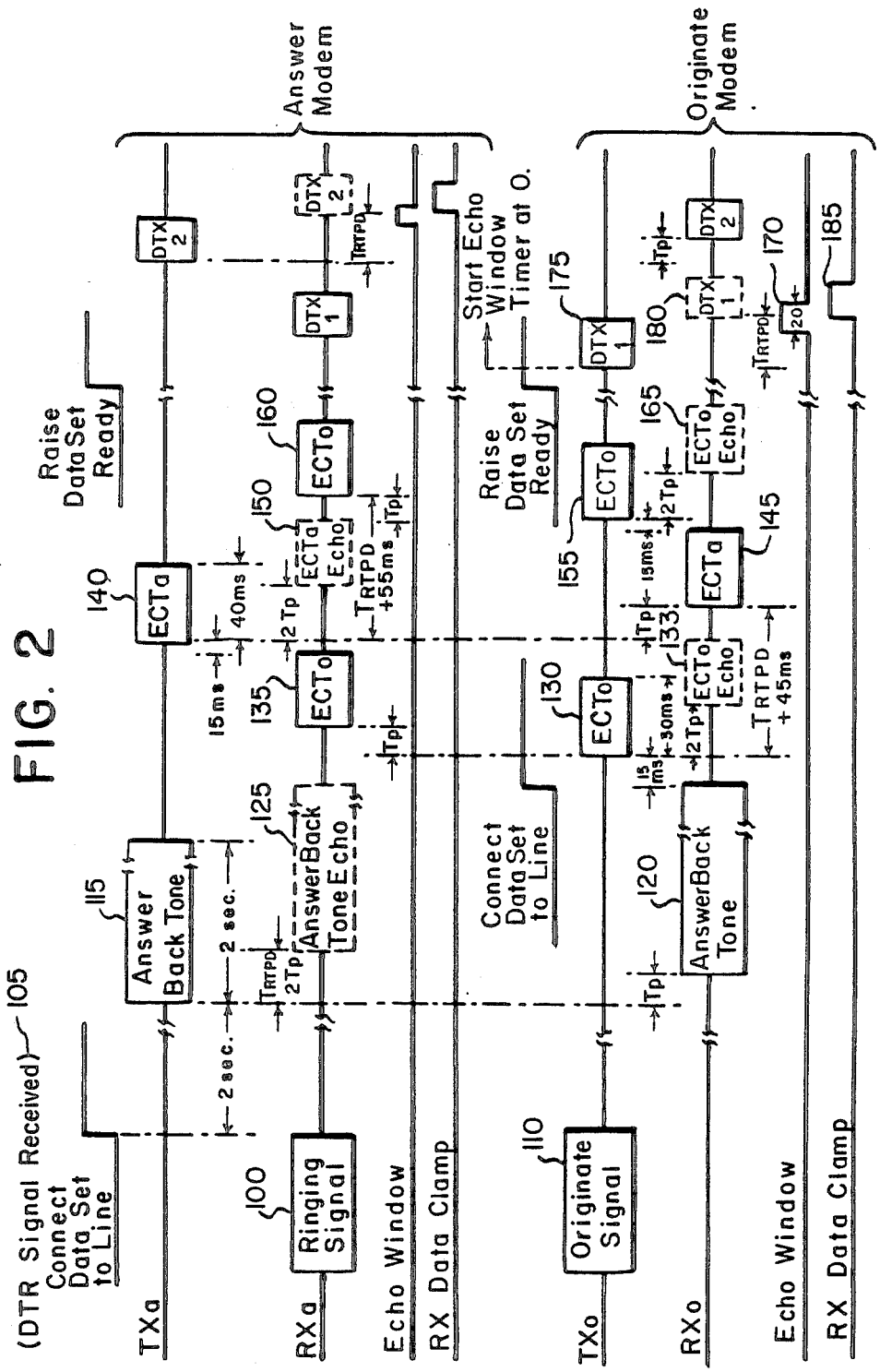
FIG. 2 depicts certain signals present during handshaking and data communication in the present invention.
Figure 3:
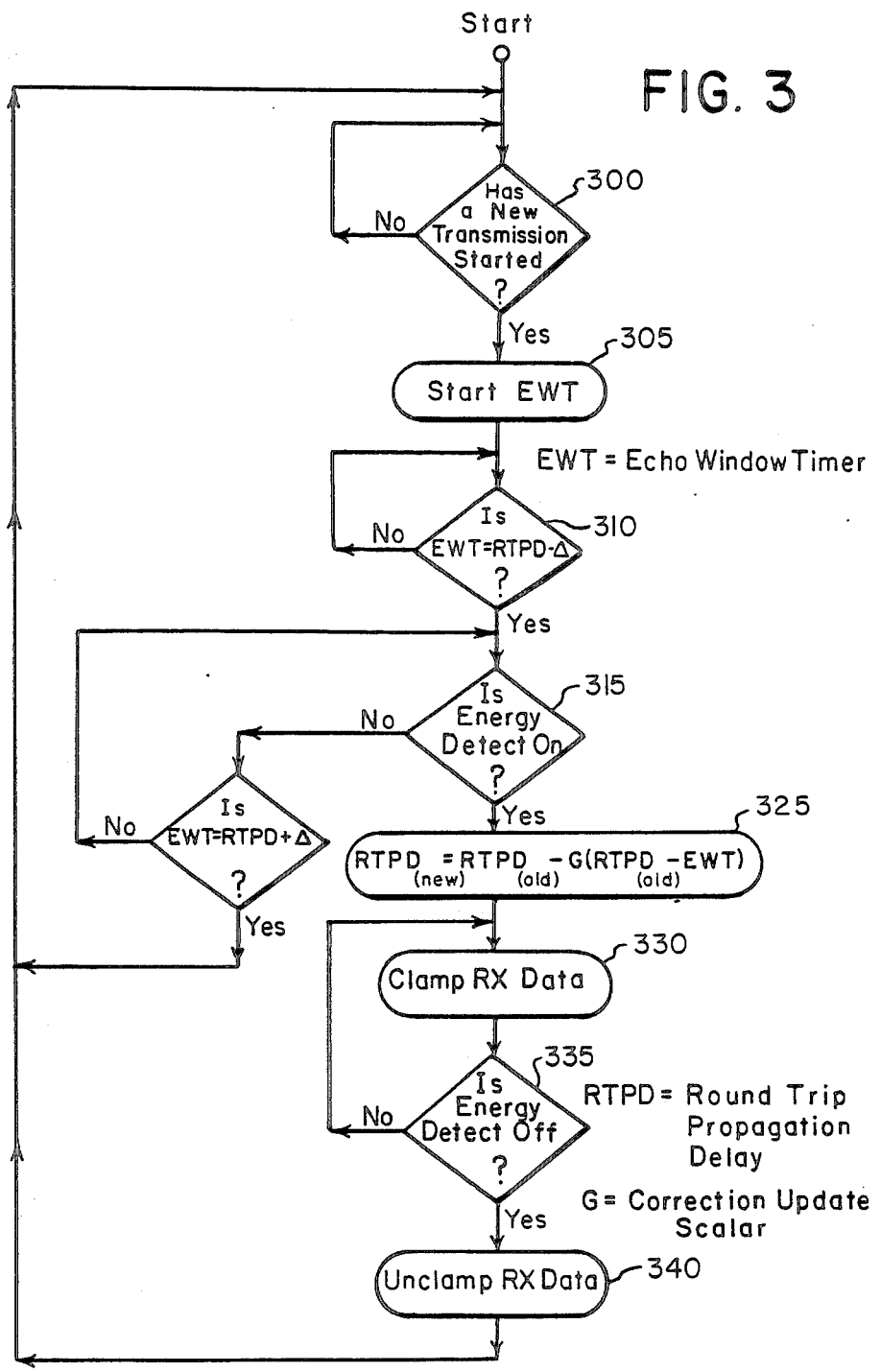
FIG. 3 is a flow chart illustrating the operation of certain aspects of the present invention.
Figure 3A:
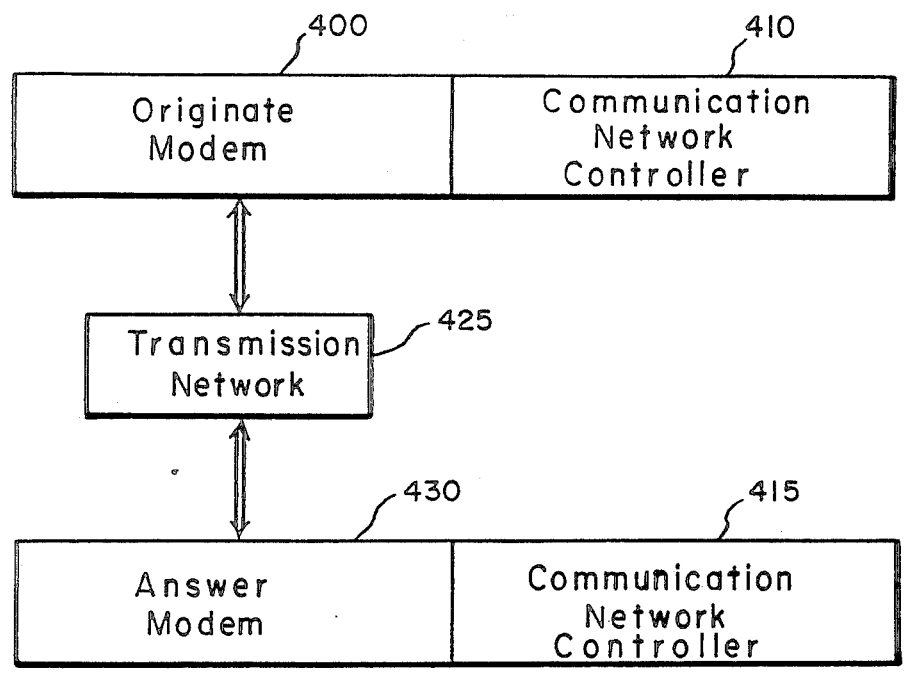
Figure 4:
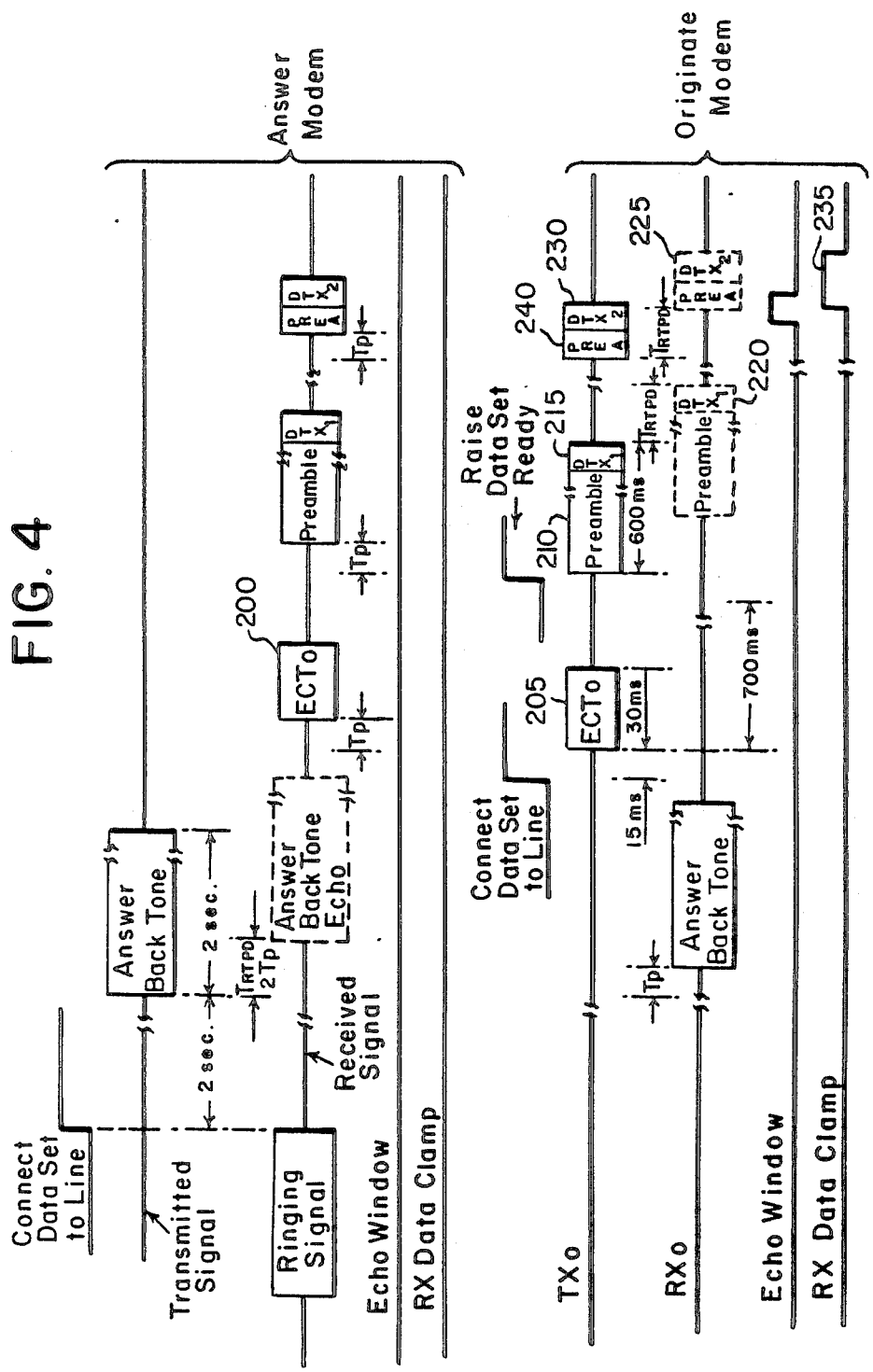
FIG. 4 depicts certain signals present during handshaking and data communication in a second mode of operation of the present invention.

With reference to the timing charts of FIG. 2, the handshaking sequence begins as in the prior art by applying a ringing signal to an answer modem in response to a signal from an originate modem. Illustratively, the originate modem is modem 30 of FIG. 1 and the answer modem is modem 40. The ringing signal is depicted on the $RX_a$ line of FIG. 2 which illustrates the signal received at the input to the answer modem from the communication network. Modem 40 will not answer the ring until it receives from data source/sink 20 a data terminal ready (DTR) signal, indicating that the data source/sink is prepared to receive data. Upon receipt of the DTR signal, the answer modem is connected to the communication line.

For a period of 1.5 to 2 seconds, the answer modem reamins silent. It then transmits an answerback tone for a duration of about two seconds. This tone is shown on the $TX_a$ line of FIG. 2 which illustrates the signal transmitted fromthe answer modem to the communication network. This tone is a pure tone of about 2025 Hz. In conventioanl circuits, the use of such a tone without any other signal will disable any echo suppressor in the line so that signals can be both transmitted and received over the communication network.

After a propagation delay of $T_p$, the answerback tone is received at originate modem 30 as shown on the $RX_o$ line of FIG. 2 which illustrates the signal received at the input to the originate modem from the communication network. After another propagation delay of $T_p$, the echo of the answerback tone is received at the input to the answer modem as shown on the $RX_a$ line of FIG. 2.

After receipt of the answerback tone at originate modem 30, modem 30 is connected to the communication line and after a period of about 15 msec. a first echo control training ($ECT_o$) sequence is transmitted from the originate modem. This sequence illustratively is a random data sequence of 25 msec. followed by 5 msec. of scrambled MARKS as shown on the $TX_o$ line of FIG. 2. This sequence is long enough to be recognized at the remote end of the communication network by a compatible modem but is too short to be recognized by standard AT&T modems. The sequence of scrambled marks identifies the $ECT_o$ sequence as coming from the originate modem so that the originate modem is able to recognize and ignore the echo of the $ECT_o$ sequence.

Simultaneously with the start of transmission, the originate modem starts a timer. After the propagation delay of $T_p$, the $ECT_o$ sequence is received at the answer modem as shown on the $RX_a$ line of FIG. 2. If the answer modem is a compatible modem, it recognizes the $ECT_o$ sequence and at a specified time after its end, e.g., 15 msec., the answer modem begins transmission of its own echo canceller training ($ECT_a$) sequence back to the originate modem as shown on the $TX_a$ line of FIG. 2. This sequence illustratively is a random data sequence of 25 msec. followed by 15 msec. of scrambled SPACES and is long enough to be recognized by the originate modem. The sequence of scrambled SPACES identifies the $ECT_a$ sequence as coming from the answer modem so that the answer modem is able to recognize and ignore the echo of the $ECT_a$ sequence.

After the propagation delay of $T_p$, the $ECT_a$ sequence is received at the originate modem, which recognizes it as being from the answer modem and stops the timer and calculates the round trip propagation delay, $T_{RTPD}$ of the ECT sequences, taking into account the length of the $ECT_o$ sequence and the known time between the end of the receipt of the $ECT_o$ sequence at the answer modem and the beginning of transmission of the $ECT_a$ sequence.

After detecting the end of the $ECT_a$ sequence, the originate modem remains silent for a specified period such as 15 msec. and then transmits a second $ECT_o$ sequence shown on the $TX_o$ line of FIG. 2 for a period of 30 msec. After a propagation delay of $T_p$, this $ECT_o$ sequence is received by the answer modem which recognizes the $ECT_o$ sequence as being from the originate modem, stops its timer, and calculates the round trip propagation delay $T_{RTPD}$ of the ECT sequences, taking into account the length of the $ECT_a$ sequence and the time between the end of the received $ECT_a$ sequence and the beginning of the transmitted $ECT_o$ sequence.

As a result of this process, each modem determines the round trip propagation delay $T_{RTPD}$ for the communication link to the other modem and accordingly knows exactly when it will receive any echoes from any data it transmits. Accordingly, it can adjust the timing of any receiver squelch technique so that the receiver is squelched only as long as is necessay to suppress echoes that could be received from the particular communication link then connecting the two modems. In particular, with reference to FIGS. 2 and 5, upon beginning data transmission, the transmitting modem stars an echo window timer that opens an echo window at $T_{RTPD} \pm \Delta$ where $\Delta$ is a small value such as 10 msec. If energy is detected at the receiver during this echo window, the energy is assumed to be an echo and the receiver is squelched by clamping the receive data line RX data until energy is no longer detected. In addition, as soon as energy is detected, a new calculation of $T_{RTPD}$ is performed such that:

$$T_{RTPD\ new} = T_{RTPD\ old} - G(T_{RTPD\ old} - EWT)$$

where G is a correction update scalar and EWT is the elapsed time on the echo window timer between start of data transmission and detection of echo energy.

Moreover, because the quality of a communication link—and therefore the length and/or nature of the training sequence or preamble to be used with it—varies with the round trip propagation delay, knowledge of $T_{RTPD}$ also enables the modem to select an optimum length preamble for use in data communication over the particular communication link then connecting the two modems. For example, if $T_{RTPD}$ is quite low, e.g., less than about 20 msec., the modem can assume the communication link is a local two-wire network with good line characteristics. Accordingly, the training sequence used for data communication can be quite low, e.g., 25 msec. Likewise, if $T_{RTPD}$ is quite high, e.g., more than 200 msec., the modem can assume the communicaiton link is a satellite communication link and will have good line characteristics. Accordingly, at least after training is completed, a very short training sequence such as 25 msec. can be used. On the other hand, if $T_{RTPD}$ is between 20 and 200 msec., the modem can assume that a land link of some length is being used and that poor line quality may be encountered. In this circumstance, a longer training sequence such as 50 msec. is desirable. However, since this longer preamble is used only over the type of communication link where it is needed, no loss in data throughput is suffered by unnecessary use of the longer preamble over local or satellite links.

If the answer modem is not compatible with the originate modem, it will not recognize the first $ECT_o$ sequence and will not send back an $ECT_a$ sequence. As a result, as shown in FIG. 6, the timer that began running with transmission of the first $ECT_o$ sequence will time out, e.g., after 700 msec., thereby indicating that the answer modem is not compatible. The originate modem will then enter a default mode in which it begins transmission by sending a 600 msec. preamble followed by a data message and measures $T_{RTPD}$ by using a timer to measure the time between the end of the data message it transmits and the end of the echo it receives of such data message. Having determined $T_{RTPD}$, the originate modem then knows exactly when it will receive any echoes from the data it transmits and can adjust the receiver squelch timing so as to squelch the receiver only as long as necessary to suppress echoes from the data transmitted by the originate modem. As soon as $T_{RTPD}$ is determined the modem can then use a shorter preamble, e.g., 50 msec., since it knows exactly when to expect the echo.

As a result, the adaptive receiver squelch technique of the present invention is backward compatible to the blind receiver squelch technique used by current AT&T modems. Modes of operation may be mixed, One modem may use the blind receiver squelch technique and the other may use the adaptive receiver squelch method. Throughput is improved even in a mixed mode configuration.

What is claimed is:

1. A method of minimizing echo problems in communication between an originate modem and an answer modem interconnected by a communication line comprising the steps of:

measuring at the originate modem, the answer modem, or both, the round trip propagation delay of the communication line interconnecting the modems, using said round trip propagation delay during subsequent data transmission over said communication line to determine when to expect an echo on said communication line from a data message transmitted by one of said modems, monitoring the communication line at the time when the echo is expected at the transmitting modem, and squelching a receiver at said transmitting modem while the echo is detected.

2. A method of minimizing echo problems in communication between an originate modem and an answer modem interconnected by a communication line comprising the steps of:

measuring at the originate modem, the answer modem, or both, the round trip propagation delay time of the communication line interconnecting the modems, during subsequent data transmission over said communication line, monitoring the communication line at the round trip propagation delay time for receipt of echo energy on said communication line from a data message tranmitted by a transmitting modem, and squelching a receiver at said transmitting modem while echo energy is detected.

3. In a method of handshaking and signaling between an originate modem and an answer modem interconnected by a communication line comprising the steps of:

causing a ringing signal to be applied to the answer modem in response to a signal from the originate modem;

connecting the answer modem to the communication line after receipt of the ringing signal;

transmitting an answerback tone from an answer modem to the originate modem after a period of silence following connection of the answer modem to the communication line; and connecting the originate modem to the communication line after receipt of the answerback tone, the improvement comprising the steps of:

measuring at the originate modem, the answer modem, or both, the round trip propagation delay of the communication line interconnecting the modems, using said round trip propagation delay during subsequent data transmission over said communication line to determine when to expect an echo on said communication line from a data message transmitted by one of said modems, monitoring the communication line at the time when the echo is expected at the transmitting modem, and squelching a receiver at said transmitting modem while the echo is detected.

4. In a method of handshaking and signaling between an originate modem and an answer modem interconnected by a communication line, causing a ringing signal to be applied to the answer modem in response to a signal from the originate modem;

connecting the answer modem to the communication line after receipt of the ringing signal;

transmitting an answerback tone from an answer modem to the originate modem after a period of silence following connection of the answer modem to the communication line; and connecting the originate modem to the communication line after receipt of the answerback tone, the improvement comprising the steps of:

measuring at the originate modem, the answer modem, or both, the round trip propagation delay time of the communication line interconnecting the modems, during subsequent data transmission over said communication line, monitoring the communication line at the round trip propagation delay time for receipt of echo energy on said communication line from a data message transmitted by a transmitting modem, and squelching a receiver at said transmitting modem while echo energy is detected.

* * * * *